Oct. 16, 1962     T. C. CHURCHER     3,058,823
TREATMENT OF MOLTEN FERROUS METAL
Filed April 12, 1960
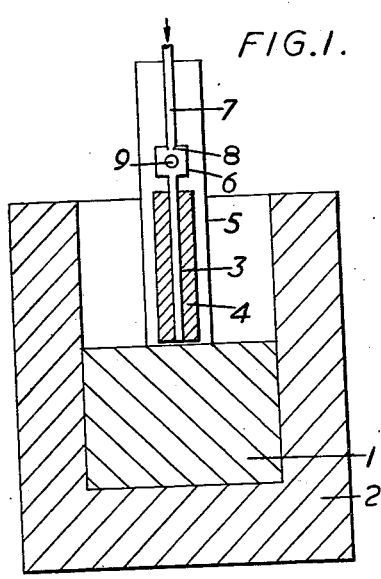
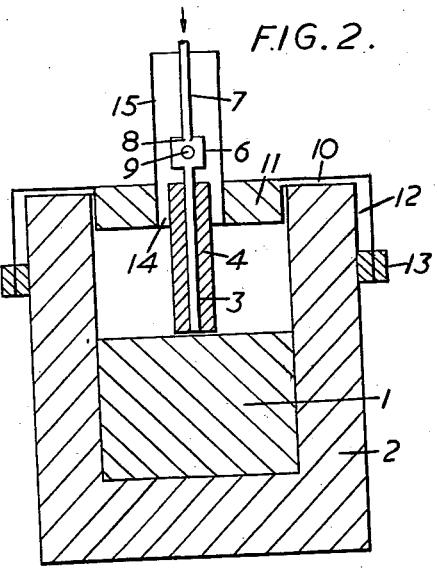
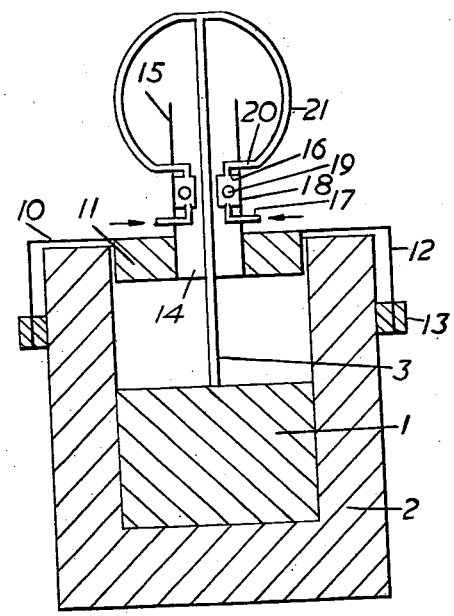
Inventor
THOMAS CHRISTOPHER CHURCHER
By *Aaron R. Townshend*
Attorney United States Patent Office 3,058,823
Patented Oct. 16, 1962

3,058,823
TREATMENT OF MOLTEN FERROUS METAL
Thomas Christopher Churcher, Sutton, Surrey, England, assignor to The British Oxygen Company Limited, a British company
Filed Apr. 12, 1960, Ser. No. 21,653
Claims priority, application Great Britain Apr. 13, 1959
7 Claims. (Cl. 75—60)

This invention relates to processes for the treatment of molten ferrous metal in which an oxidizing gas is blown into or onto the melt to effect a reduction in the content of those impurities (such as, for example, silicon and phosphorus) which are easily removed by oxidation.

The term "oxidizing gas" as used herein is intended to cover oxygen either alone or in admixture with other gases. Examples of such oxidizing gases are oxygen, oxygen-enriched air, and oxygen in admixture with steam or carbon dioxide. If desired, powdered solids, such as solid oxidizing agents or slag-forming materials may be blown in with the oxidizing gas. For example, where phosphorus is to be removed, powdered lime may be added in this manner.

Such oxidative treatment of molten ferrous metal is accompanied by the evolution of considerable quantities of fume. The fume evolved consists mainly of fine particles of oxides of iron suspended in unreacted oxidizing gas and gaseous combustion products and is very strongly coloured. Its evolution is objectionable not only from the point of view of air-pollution but also because it represents a considerable loss of iron.

It is an object of the present invention to recover a part of the fume evolved during the treatment of molten ferrous metal with an oxidizing gas.

According to the present invention, in a process for the treatment of molten ferrous metal by blowing a stream of an oxidizing gas as hereinbefore defined into or onto the melt, a part of the fume evolved during the treatment is entrained by injector action in the stream of oxidizing gas and is returned therewith to the melt.

The oxidative treatments to which the present invention relates are usually carried out in an open-topped vessel which may be stationary, such as a converter, or movable, such as a ladle. Such vessels may or may not be provided with a removable cover and the process of the present invention can be used in either case. As would be expected, a higher proportion of the total fume is in general recovered when a closed vessel is used. Where it is desired to dispense one or more solid oxidizing agents and/or fluxing agents in powder form in the oxidizing gas, it may be convenient to suspend them in a separate stream of oxidizing gas fed through a separate lance to the melt.

Various methods of putting into practice the process of the present invention will now be described with reference to the accompanying drawing in which FIGURES 1, 2 and 3 show in diagrammatic side section, three different arrangements for carrying out the invention. In the figures, like parts are designated by the same reference numeral.

Referring to FIGURE 1, which shows the invention as applied to an open ladle, the oxidizing gas is blown into the melt 1, held in the ladle 2, through a substantially non-consumable lance 3, provided with a refractory coating 4 covering that part of the lance which in use is within the ladle 2 and is thus subjected to a high temperature. The lance is provided with a sleeve 5 of refractory material surrounding and spaced from the lance 3 and closed at its upper end. The lower end of the sleeve 5 is arranged to be closed by the surface of the melt when the lance 3 is in position for blowing, so that a large part of the fume evolved is trapped within the sleeve 5. It has been found that the fume is evolved from a region around the tip of the lance and can therefore be largely collected within the sleeve 5. This fume is withdrawn from the sleeve into the stream of oxidizing gas by means of injector device comprising a chamber 6 formed at the end of the lance 3 into which the oxidizing gas is fed through a tube 7 having a nozzle 8 within the chamber 6. The chamber 6 is provided with one or more holes 9 communicating with the interior of the sleeve 5. The stream of oxidizing gas leaving the nozzle 8 exerts an injector action to suck fume through the hole or holes 9 into the chamber 6 where it is entrained in the oxidizing gas stream and returned to the melt through the lance 3.

Although in the figure, the end of the lance 3 is shown as located approximately at the surface of the melt 1, it will be appreciated that the end of the lance could, if desired, be maintained below the surface of the melt. Moreover, the lance could, if desired, be water-cooled rather than refractory coated. Alternatively, the lance could be replaced by a refractory-coated or water-cooled probe stationed above the surface of the melt, so as to direct a stream of oxidizing gas towards and against the surface of the melt.

FIGURE 2 shows one method of applying the invention to a closed ladle. In this case, the ladle 2 is provided with a lid 10 having a refractory lining 11 over that part which covers the actual mouth of the ladle and is therefore exposed to high temperatures. The outer periphery of the lid is provided with a dependent skirt 12 which is embedded in sand contained in an annular trough 13 surrounding the ladle 2 to form an efficient seal. The lid is provided with a central opening 14 on which is mounted a tubular chimney 15. The lance 3 passes through the chimney opening and the injector mechanism is located within the chimney. The fume evolved leaves the ladle 2 through the chimney 15 and a considerable part thereof is sucked into the oxidizing gas stream through the holes 9 by the injector action of the gas stream and recycled therewith to the melt.

It will be appreciated that the arrangement shown in FIGURE 2 is only satisfactory where a probe or a non-consumable lance (either refractory-coated as illustrated or water-cooled) is used. Where a consumable lance is used, the consumption of the lance would result in the injector means eventually dropping below the chimney into the interior of the ladle unless the length of the chimney was greater than the length of lance consumed. This could lead to a chimney of such length as to be impracticable. In these circumstances the arrangement shown in FIGURE 3 may be used. In this arrangement, the injector chamber 6 on the lance is replaced by one or more fixed injectors mounted within the chimney 15 are used. Each of these injectors comprises a chamber 16, an oxidizing gas inlet tube 17 opening into the chamber through a nozzle 18, one or more holes 19 affording communication between the chamber 16 and the chimney 15 and an oxidizing gas outlet tube 20. The oxidizing gas in its passage through the chamber 16 entrains part of the fume from the chimney and the fume-laden gas leaves through the outlet tube and thence through a flexible tube 21 to the top of the lance 3. Two such injector systems are shown in FIGURE 3.

It will be appreciated that although much of the fume is entrained in the oxidizing gas stream and re-cycled, some of the fume will nevertheless escape into the atmosphere or into a fume-removal plant where one is used. The amount so escaping is, however, considerably less than would be the case if the present invention were not used, as is shown by the following examples:

*Example 1*

Four comparative experiments were carried out, in all cases 90 lb. of molten iron being blown with oxygen for 2 minutes at a rate of 600 cu. ft./hr. (equivalent to 500 cu. ft./ton of metal). The fume recovery arrangements for the four blows were as follows:

Blows Nos. 1 and 2—a normal oxygen lance was used without fume recovery;
Blow No. 3—an arrangement as shown in FIGURE 1 was used;
Blow No. 4—an arrangement as shown in FIGURE 3 was used, two fixed injectors being provided in the chimney;

The results obtained are shown in the following table:

| Blow No. | Temp. (° C.) | | Silicon removal (percent) | Total fume formed (lb.) |
|---|---|---|---|---|
| | Before blowing | After blowing | | |
| 1 | 1,360 | 1,530 | 0.82 | 0.38 |
| 2 | 1,345 | 1,440 | 0.69 | 0.59 |
| 3 | | 1,380 | 0.55 | 0.01 |
| 4 | 1,385 | 1,480 | 0.72 | 0.14 |

*Example 2*

In order to illustrate the application of the present invention to a dephosphorizing treatment, 110 lbs. of molten metal was used and a mixture of 9 lb. crushed lime and 1 lb. fluorspar was added as a surface addition to the melt. The composition of the metal before treatment was carbon 4.0%, silicon 0.4%, phosphorus 0.7%. The metal was blown for 6 minutes with oxygen at the rate of 10 cu. ft./min. using an arrangement according to FIGURE 3. At the end of that time, the metal composition was carbon 3.1%, silicon 0%, phosphorous 0.06%. The optical density of the fume was 0.13. In similar tests in which no recycling of the fume was carried out, the optical density of the fume averaged 0.46.

The process of the present invention has the additional advantage that a more efficient use of the oxidizing gas is obtained, since not only is most of the initially unreacted oxidizing gas recycled so as to be able to react on its second passage, but in addition oxides of carbon formed by the oxidation of carbon in the metal will also be recycled and will subsequently react to oxidize further impurities other than carbon, for example in the case of silicon according to the equations:

$$Si + CO_2 \rightarrow SiO_2 + C$$
$$Si + 2CO \rightarrow SiO_2 + 2C$$

This effect is of particular importance in cases where it is desired to reduce the phosphorus content of iron without excessive decarburization, for example, the production of refined foundry iron or in dephosphorisation prior to steelmaking.

The process of the present invention may be applied not only to the pretreatment of molten ferrous metal prior to its conversion to steel in a furnace or converter but also to the direct manufacture of steel from molten pig iron in a suitable vessel.

I claim:
1. In the treatment of molten ferrous metal by blowing with a stream of an oxidizing gas, the step of entraining in said stream of oxidizing gas a part of the fume evolved during the treatment by injector action produced by the kinetic energy of said stream of oxidizing gas and returning said part of the fume with said stream of oxidizing gas to the melt.
2. In the treatment of molten ferrous metal by blowing with a stream of an oxidizing gas containing at least one solid oxidizing agent in powder form suspended therein, the step of entraining in said stream of oxidizing gas a part of the fume evolved during the treatment by injector action produced by the kinetic energy of said stream of oxidizing gas and returning said part of the fume with said stream of oxidizing gas to the melt.
3. In the treatment of molten ferrous metal by blowing with a stream of an oxidizing gas containing at least one fluxing agent in powder form suspended therein, the step of entraining in said stream of oxidizing gas a part of the fume evolved during the treatment by injector action produced by the kinetic energy of said stream of oxidizing gas and returning said part of the fume with said stream of oxidizing gas to the melt.
4. Apparatus for the treatment of molten ferrous metal comprising an open-topped vessel for said molten metal, a removable lid closing the top of said vessel, a chimney carried by said lid for the escape of fume from said vessel, means passing through said chimney for the delivery of a stream of oxidizing gas to molten ferrous metal in said vessel and injector means located within said chimney adapted to be operated by a stream of oxidizing gas passing to said oxidizing gas delivery means to withdraw fume from said chimney and entrain it in said stream of oxidizing gas.
5. Apparatus according to claim 4 wherein said injector means is carried by said oxidizing gas supply means.
6. Apparatus according to claim 4 wherein said injector means is fixedly mounted on the wall of said chimney.
7. Apparatus according to claim 4 wherein said injector means comprises a chamber, an inlet nozzle for the entry of oxidizing gas to said chamber, an outlet for oxidizing gas from said chamber and at least one orifice in the wall of said chamber through which fume is sucked into said chamber by the injector action of oxidizing gas leaving said inlet nozzle.

References Cited in the file of this patent

UNITED STATES PATENTS

| | | |
|---|---|---|
| 2,529,387 | Haglund | Nov. 7, 1950 |
| 2,707,677 | Graef | May 3, 1955 |